Patented Aug. 22, 1950

2,519,780

UNITED STATES PATENT OFFICE 2,519,780

HERBICIDAL FORMULATIONS

Henry L. Morrill, Clayton, Mo., assignor to Monsanto Chemical Company, St. Louis, Mo., a corporation of Delaware No Drawing. Application August 11, 1949,
Serial No. 109,801

16 Claims. (Cl. 71—2.6)

This invention relates to the water soluble salts of 2,4-dichlorophenoxyacetic acid; more specifically, this invention relates to compositions containing the water soluble salts of 2,4-dichlorophenoxyacetic acid and a minor amount of the condensation product of one part of abietic acid, tall oil or rosin with from about 0.5 part to about 2.0 parts of ethylene oxide, from which compositions herbicidal formulations may be prepared in hard water without the precipitation of the calcium salt of 2,4-dichlorophenoxyacetic acid.

The water soluble salts of 2,4-dichlorophenoxyacetic acid are of considerable utility as herbicides. When the water soluble salts of 2,4-dichlorophenoxyacetic acid were first used in agriculture, they were generally applied as dilute solutions of the water soluble salts containing about 0.1–0.2% as 2,4-dichlorophenoxyacetic acid, at the rate of 100 gallons or more per acre. At this low concentration, little or no difficulty was experienced with precipitation of the insoluble calcium salt in hard water, since calcium 2,4-dichlorophenoxyacetate is soluble in water to the extent of about 0.33%. In the presence of excess 2,4-dichlorophenoxyacetate ion, however, the solubility of calcium 2,4-dichlorophenoxyacetate is greatly reduced, dropping to about 0.03% in solutions containing 1%–5% 2,4-dichlorophenoxyacetic acid.

With the advent of low volume spraying techniques, by which solutions containing 1%–5% 2,4-dichlorophenoxyacetic acid were applied at the rate of 15–25 gallons per acre, difficulties arose due to the precipitation of calcium 2,4-dichlorophenoxyacetate in hard water areas, the flocculent precipitate, forming within a few minutes after dilution of a 2,4-dichlorophenoxyacetic acid concentrate, quickly plugging the fine screens and nozzles of the low volume spraying equipment. In order to utilize the advantages of the low volume spraying techniques, it, therefore, becomes necessary to prepare 2,4-dichlorophenoxyacetic acid solutions which will not result in the precipitation of calcium 2,4-dichlorophenoxyacetate when hard water is used as a diluent.

It is an object of this invention to provide improved herbicidal compositions containing the water soluble salts of 2,4-dichlorophenoxyacetic acid.

It is another object of this invention to provide improved herbicidal compositions, containing the water soluble salts of 2,4-dichlorophenoxyacetic acid which may be dissolved in hard water without the resultant precipitation of significant quantities of calcium 2,4-dichlorophenoxyacetate.

It is a still further object of this invention to provide aqueous herbicidal formulations wherein the water soluble salt of 2,4-dichlorophenoxyacetic acid is the active ingredient, which aqueous formulations are characterized by their substantial freedom from deleterious quantities of precipitated calcium 2,4-dichlorophenoxyacetate.

Other objects will become apparent from the description of the novel compositions of this invention and the claims.

It has now been discovered that the precipitation of calcium 2,4-dichlorophenoxyacetate is substantially eliminated if the water soluble salt of 2,4-dichlorophenoxyacetic acid dissolved in hard water has incorporated therein a minor amount of the condensation product of 1 part of abietic acid, rosin or tall oil with from about 0.5 to about 2.0 parts of ethylene oxide. The minor amount of the condensation product of abietic acid, rosin or tall oil with ethylene oxide utilized in the novel compositions of this invention, may be incorporated into the water soluble salt of 2,4-dichlorophenoxyacetic acid in any of various ways. The condensation product may be mixed with the water soluble salt of 2,4-dichlorophenoxyacetic acid prior to solution in hard water. The condensation product may be added to an aqueous concentrate of the water soluble salt of 2,4-dichlorophenoxyacetic acid prior to dilution with hard water. 2,4-dichlorophenoxyacetic acid, a basic material which will react with the 2,4-dichlorophenoxyacetic acid to form its water soluble salt, and the condensation product may be mixed simultaneously in an aqueous medium to prepare an aqueous formulation of a water soluble salt of 2,4-dichlorophenoxyacetic acid, having incorporated therein a minor amount of the condensation product. The condensation product may be added to the hard water which is to be used to dilute a concentrate containing a water soluble salt of 2,4-dichlorophenoxyacetic acid.

In the novel compositions of this invention, the expression, "water soluble salts of 2,4-dichlorophenoxyacetic acid" is broad enough to include the alkali metal salts, such as, sodium, potassium and lithium, the ammonium salt, and the organic substituted ammonium salts, viz., the amine salts such as the dimethylamine, diethylamine, triethylamine, isopropylamine, diethanolamine, triethanolamine and isopropanolamine salts. The condensation product utilized in the novel compositions of this invention is obtained by reacting abietic acid, rosin or tall oil with gaseous ethylene oxide until between about 0.5 and about 2.0 parts by weight of ethylene oxide have been combined with each part of abietic acid, rosin or tall oil. However, the preferred condensation product contained between about 1.0 and about 1.7 parts by weight of combined ethylene oxide per part of abietic acid, rosin or tall oil.

While the condensation products utilized in the novel compositions of this invention may be prepared using abietic acid, rosin or tall oil as one of the reactants in the condensation reaction, economical advantages dictate the advisability of utilizing crude tall oil, refined tall oil or rosin in preference to abietic acid. Furthermore, mixtures of two or more of their components, viz., abietic acid, crude tall oil, refined tall oil, and rosin, may be condensed with ethylene oxide utilizing the previously prescribed range of reactants, to produce condensation products having utility in the novel compositions of this invention.

Crude tall oil is obtained as a by-product in large quantities in the paper industry, wherein paper pulp is produced by the sulfate process; the major constituents of the oil comprise resin acids, fatty acids and certain non-acid constituents, chiefly sterols, and the like. The composition of crude tall oil is somewhat variable; however, it usually has a composition within the following limits.

| | Per cent |
|---|---|
| Fatty acids | 40–55 |
| Resin acids | 35–50 |
| Non-acids | 6–10 |

In some cases the aforementioned crude tall oil may be refined or semi-refined by distillation or solvent extraction wherein a portion of the resin acids and sterols are removed. This refined tall oil may contain from about 50% to 65% of free fatty acids, the balance being abietic acid and sterols, and as such, may be employed for the production of the herein described condensation products utilized in the novel composition of this invention.

The physical properties of the condensation products produced from tall oil or rosin depend upon the amount of ethylene oxide combined therewith. The tall oil-ethylene oxide product at room temperature is a readily flowing, sticky oil in the lower ranges of combined ethylene oxide, becoming more viscous as the amount of ethylene oxide is increased.

The rosin-ethylene oxide product of the preferred range is an oily liquid having approximately the same fluidity as the tall oil product. As the ethylene oxide content of the product is increased, it becomes somewhat more viscous.

The reaction may be carried out at any temperature above the melting point of the material treated. Generally, a temperature above 130° C., but below 190° C., is suitable. An alkali metal hydroxide may or may not be used to catalyze the reaction. In the absence of the catalyst the reaction necessarily proceeds slower.

The following examples are illustrative of the manner in which these condensation products may be prepared:

Example A 100 g. of abietic acid is heated to a temperature between 185° C. and 190° C. 0.5 g. of potassium hydroxide is added. Ethylene oxide gas is passed into the abietic acid until 140 g. has combined with the abietic acid. The product is a viscous, sticky oil at room temperature.

Example B 1,000 lbs. of crude tall oil contained in a suitable vessel is heated to a temperature of about 130° C., and 2.5 lbs. of potassium hydroxide added. Ethylene oxide in gaseous form is passed into the tall oil until approximately 1,400 lbs. of ethylene oxide has combined. The product is an oily material.

Example C 100 g. of refined tall oil is heated in an oil bath to a temperature of about 180° C., and 0.25 g. of potassium hydroxide added. Gaseous ethylene oxide is passed into the tall oil until 160 g. of ethylene oxide has been absorbed.

Example D 50 g. of rosin is heated at a temperature of about 185° C., and 0.3 g. of potassium hydroxide added. Gaseous ethylene oxide is introduced into the rosin until 85 g. of ethylene oxide has been absorbed.

In order to prepare herbicidal formulations comprising the water soluble salts of 2,4-dichlorophenoxyacetic acid, only minor amounts of the aforementioned condensation products need be incorporated into the water soluble salts of 2,4-dichlorophenoxyacetic acid. The exact amount of the condensation product utilized is necessarily dependent upon the degree of hardness of the water utilized as a diluent and the degree of solution stability desired. Generally, the preferred range is from about 1–5% by weight of the condensation product based on the 2,4-dichlorophenoxyacetic acid content of the water soluble salt. Less than 1%, even as low as 0.05%, of the condensation product by weight may be utilized when the water used as a diluent has only a minor degree of hardness. Furthermore, the concentration of the condensation product may exceed 5% when a high degree of hardness in the water dictates the necessity. Large quantities of the condensation product are not deleterious.

The novel aqueous herbicidal formulations of this invention may also have incorporated therein, in addition to the water soluble salts of 2,4-dichlorophenoxyacetic acid and the aforementioned condensation products, various surface active agents, wetting agents, or freezing point depressants in order to enhance the over-all properties of the herbicidal formulation. Typical of the surface active agents and wetting agents which may be utilized in the novel compositions of this invention are alkyl aryl sulfonates, condensation products of ethylene oxide and tertiary alkyl mercaptans, dialkyl sodium sulfosuccinates, sodium alkyl sulfates, and so forth. Typical of the freezing point depressants which may be utilized in the novel compositions of this invention are methanol, ethanol, and isopropanol, etc.

The outstanding properties of the novel compositions of this invention are made more clearly evident by the examples given in the table. In these examples an approximately 50% solution of 2,4-dichlorophenoxyacetic acid in the form of a water soluble salt was prepared in distilled water, utilizing a very slight excess of the basic salt-forming agent. Water containing 1,000 P. P. M. of total hardness as $CaCO_3$, with a Ca/Mg ratio of 2.9/1 as $CaCO_3$, was prepared by dissolving 1.093 g. of $CaCl_2.2H_2O$ and 0.521 g. of $MgCl_2.6H_2O$ in distilled water and diluting to 1 liter. Approximately 2½ ml. of the above prepared concentrate of a water soluble salt of 2,4-dichlorophenoxyacetic acid, to which had been added a minor amount of the previously described condensation product, was diluted to 50 ml. with the synthetic hard water. The concentration of 2,4- dichlorophenoxyacetic acid in the dilute solution was approximately 3%, in the middle of the critical 1% to 5% range. The solutions were then observed for the development of a precipitate.

The column entitled "Salt of 2,4-dichlorophenoxyacetic acid" indicates the particular water soluble salt of 2,4-dichlorophenoxyacetic acid utilized in the hard water aqueous solution prepared as above described. The column entitled "Condensation Product" sets forth the composition of the particular condensation product utilized, indicating numerically in parenthesis after $C_2H_4O$ the parts by weight of ethylene oxide utilized for each part by weight of the first mentioned reactant. The percent indicated is the percent by weight of the condensation product, based on the 2,4-dichlorophenoxyacetic acid content of the formulation. The column entitled "Precipitation" is an interpretation of the solution stabilities obtained. "100% crystals in 5 minutes" indicates that the entire formulation was filled with crystals within 5 minutes. "Very slight after 24 hours" indicates that after 24 hours, precipitation, if any, was so slight as to be insignificant from the standpoint of deleteriously affecting the sprayability of the formulation.

In the table, 24 hours was arbitrarily used as the limit of time in view of the fact that these hard water dilutions are normally made in the field and are utilized immediately after preparation. Stability for 24 hours should, therefore, provide ample time for spraying. It is not to be inferred, however, that the solution stability was of only 24 hours' duration, as the majority of formulations exhibited a satisfactory stability for a considerably longer period of time.

The solution stabilities set forth in the preceding table clearly indicate the outstanding utility of the novel compositions of this invention. Herbicidal formulations containing a water soluble salt of 2,4-dichlorophenoxyacetic acid and a minor amount of the particular condensation product of abietic acid, tall oil or rosin and ethylene oxide, evidenced sufficient freedom from precipitation of the calcium salt as a result of the calcium ion present in hard water to permit efficient application of the particular formulation. Those hard water formulations which did not contain the particular condensation product, developed huge quantities of crystals almost immediately upon preparation, which prevented efficient application of the formulation to the fields.

*Table*

| Example | Salt of 2,4-Dichlorophenoxyacetic Acid | Condensation Product Composition | Per Cent | Precipitation |
|---|---|---|---|---|
| 1 | Sodium | None | | 100% crystals in 5 minutes. |
| 2 | Potassium | do | | Do. |
| 3 | Ammonium | do | | Do. |
| 4 | Dimethylamine | do | | Do. |
| 5 | Diethylamine | do | | Do. |
| 6 | Isopropylamine | do | | Do. |
| 7 | Triethylamine | do | | Do. |
| 8 | Diethanolamine | do | | Do. |
| 9 | Triethanolamine | do | | Do. |
| 10 | Isopropanolamine | do | | Do. |
| 11 | Sodium | Abietic acid—$C_2H_4O(1.4)$ | 1 | Very slight after 24 hours. |
| 12 | Potassium | do | 1 | Do. |
| 13 | Ammonium | do | 1 | Do. |
| 14 | Dimethylamine | do | 1 | Do. |
| 15 | Diethylamine | do | 1 | Do. |
| 16 | Isopropylamine | do | 1 | Do. |
| 17 | Triethylamine | do | 1 | Do. |
| 18 | Diethanolamine | do | 1 | Do. |
| 19 | Triethanolamine | do | 1 | Do. |
| 20 | Isopropanolamine | do | 1 | Do. |
| 21 | Sodium | Crude tall oil—$C_2H_4O(1.6)$ | 1 | Do. |
| 22 | Potassium | do | 1 | Do. |
| 23 | Ammonium | do | 1 | Do. |
| 24 | Dimethylamine | do | 1 | Do. |
| 25 | Diethylamine | do | 1 | Do. |
| 26 | Isopropylamine | do | 1 | Do. |
| 27 | Triethylamine | do | 1 | Do. |
| 28 | Diethanolamine | do | 1 | Do. |
| 29 | Triethanolamine | do | 1 | Do. |
| 30 | Isopropanolamine | do | 1 | Do. |
| 31 | Sodium | Crude tall oil—$C_2H_4O(1.4)$ | 2 | Do. |
| 32 | Potassium | do | 2 | Do. |
| 33 | Ammonium | do | 2 | Do. |
| 34 | Dimethylamine | do | 2 | Do. |
| 35 | Diethylamine | do | 2 | Do. |
| 36 | Isopropylamine | do | 2 | Do. |
| 37 | Triethylamine | do | 2 | Do. |
| 38 | Diethanolamine | do | 2 | Do. |
| 39 | Triethanolamine | do | 2 | Do. |
| 40 | Isopropanolamine | do | 2 | Do. |
| 41 | Sodium | Refined tall oil—$C_2H_4O(1.6)$ | 3 | Do. |
| 42 | Potassium | do | 3 | Do. |
| 43 | Ammonium | do | 3 | Do. |
| 44 | Dimethylamine | do | 3 | Do. |
| 45 | Diethylamine | do | 3 | Do. |
| 46 | Isopropylamine | do | 3 | Do. |
| 47 | Triethylamine | do | 3 | Do. |
| 48 | Diethanolamine | do | 3 | Do. |
| 49 | Triethanolamine | do | 3 | Do. |
| 50 | Isopropanolamine | do | 3 | Do. |
| 51 | Sodium | Rosin—$C_2H_4O(1.7)$ | 2 | Do. |
| 52 | Potassium | do | 2 | Do. |
| 53 | Ammonium | do | 2 | Do. |
| 54 | Dimethylamine | do | 2 | Do. |
| 55 | Diethylamine | do | 2 | Do. |
| 56 | Isopropylamine | do | 2 | Do. |
| 57 | Triethylamine | do | 2 | Do. |
| 58 | Diethanolamine | do | 2 | Do. |
| 59 | Triethanolamine | do | 2 | Do. |
| 60 | Isopropanolamine | do | 2 | Do. |

What is claimed is:

1. A new composition of matter comprising a water soluble salt of 2,4-dichlorophenoxyacetic acid and a minor amount of the condensation product of one part by weight of a compound selected from the group consisting of abietic acid, tall oil, rosin and mixtures thereof, and from about 0.5 part to about 2.0 parts by weight of ethylene oxide.

2. A new composition of matter comprising a water soluble salt of 2,4-dichlorophenoxyacetic acid and a minor amount of the condensation product of one part by weight of a compound selected from the group consisting of abietic acid, tall oil, rosin and mixtures thereof, and from about 1.0 part to about 1.7 parts by weight of ethylene oxide.

3. A new composition of matter comprising a water soluble salt of 2,4-dichlorophenoxyacetic acid and a minor amount of the condensation product of one part by weight of tall oil and from about 1.0 part to about 1.7 parts by weight of ethylene oxide.

4. A new composition of matter comprising an alkali metal salt of 2,4-dichlorophenoxyacetic acid and a minor amount of the condensation product of one part by weight of tall oil and from about 1.0 part to about 1.7 parts by weight of ethylene oxide.

5. A new composition of matter comprising sodium 2,4-dichlorophenoxyacetate and a minor amount of the condensation product of one part by weight of tall oil and from about 1.0 part to about 1.7 parts by weight of ethylene oxide.

6. A new composition of matter comprising a water soluble amine salt of 2,4-dichlorophenoxyacetic acid and a minor amount of the condensation product of one part by weight of tall oil and from about 1.0 part to about 1.7 parts by weight of ethylene oxide.

7. A new composition of matter comprising the dimethylamine salt of 2,4-dichlorophenoxyacetic acid and a minor amount of the condensation product of one part by weight of tall oil and from about 1.0 part to about 1.7 parts by weight of ethylene oxide.

8. A new composition of matter comprising a water soluble salt of 2,4-dichlorophenoxyacetic acid and a minor abount of the condensation product of one part by weight of rosin and from about 1.0 part to about 1.7 parts by weight of ethylene oxide.

9. A herbicidal formulation comprising an aqueous solution of a water soluble salt of 2,4-dichlorophenoxyacetic acid and a minor amount of the condensation product of one part by weight of a compound selected from the group consisting of abietic acid, tall oil, rosin and mixtures thereof, and from about 0.5 part to about 2.0 parts by weight of ethylene oxide.

10. A herbicidal formulation comprising an aqueous solution of a water soluble salt of 2,4-dichlorophenoxyacetic acid and a minor amount of the condensation product of one part by weight of a compound selected from the group consisting of abietic acid, tall oil, rosin and mixtures thereof, and from about 1.0 part to about 1.7 parts by weight of ethylene oxide.

11. A herbicidal formulation comprising an aqueous solution of a water soluble salt of 2,4-dichlorophenoxyacetic acid and a minor amount of the condensation product of one part by weight of tall oil and from about 1.0 part to about 1.7 parts by weight of ethylene oxide.

12. A herbicidal formualtion comprising an aqueous solution of an alkali metal salt of 2,4-dichlorophenoxyacetic acid and a minor amount of the condensation product of one part by weight of tall oil and from about 1.0 part to about 1.7 parts by weight of ethylene oxide.

13. A herbicidal formulation comprising an aqueous solution of sodium 2,4-dichlorophenoxyacetate and a minor amount of the condensation product of one part by weight of tall oil and from about 1.0 part to about 1.7 parts by weight of ethylene oxide.

14. A herbicidal formulation comprising an aqueous solution of an amine salt of 2,4-dichlorophenoxyacetic acid and a minor amount of the condensation product of one part by weight of tall oil and from about 1.0 part to about 1.7 parts by weight of ethylene oxide.

15. A herbicidal formulation comprising an aqueous solution of the dimethylamine salt of 2,4-dichlorophenoxyacetic acid and a minor amount of the condensation product of one part by weight of tall oil and from about 1.0 part to about 1.7 parts by weight of ethylene oxide.

16. A herbicidal formulation comprising an aqueous solution of a water soluble salt of 2,4-dichlorophenoxyacetic acid and a minor amount of the condensation product of one part by weight of rosin and from about 1.0 part to about 1.7 parts by weight of ethylene oxide.

HENRY L. MORRILL.

REFERENCES CITED

The following references are of record in the file of this patent:

FOREIGN PATENTS

| Number | Country | Date |
|---|---|---|
| 467,571 | Great Britain | June 16, 1937 |

OTHER REFERENCES

Agricultural Chemicals, April 1949, pages 27, 28, 29 and 73.